Dec. 12, 1933.    L. L. SCOTT    1,938,934
FILTERING APPARATUS
Filed June 17, 1931    2 Sheets-Sheet 2
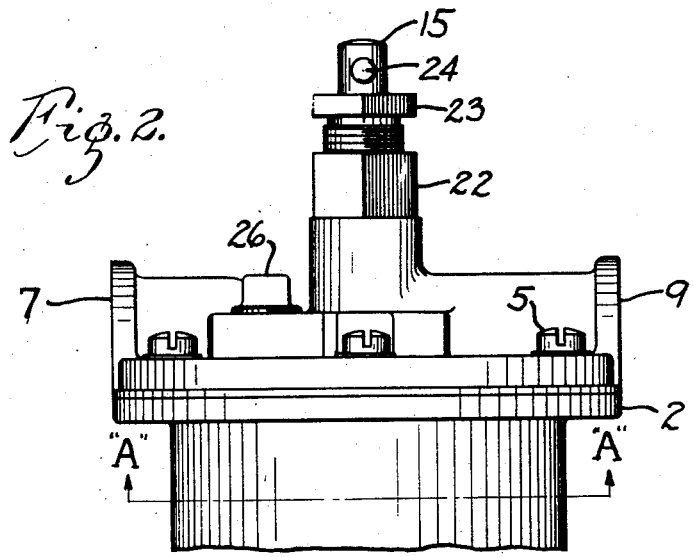
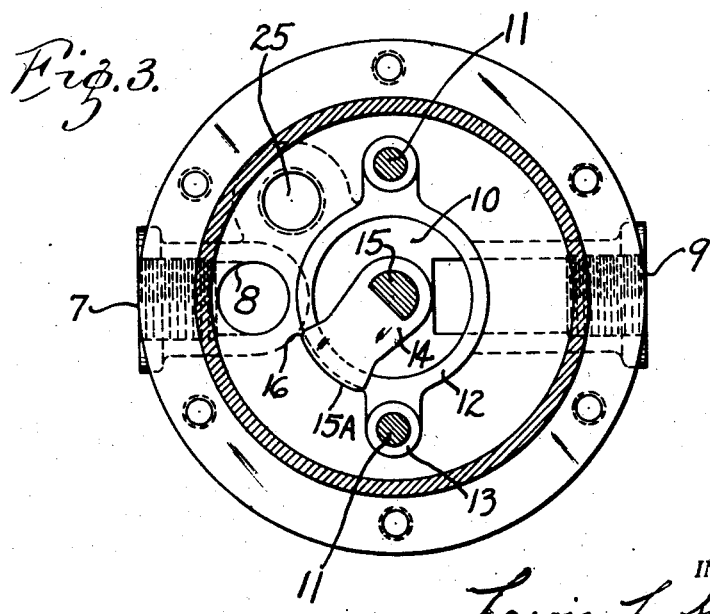
INVENTOR
Lewis L. Scott Patented Dec. 12, 1933

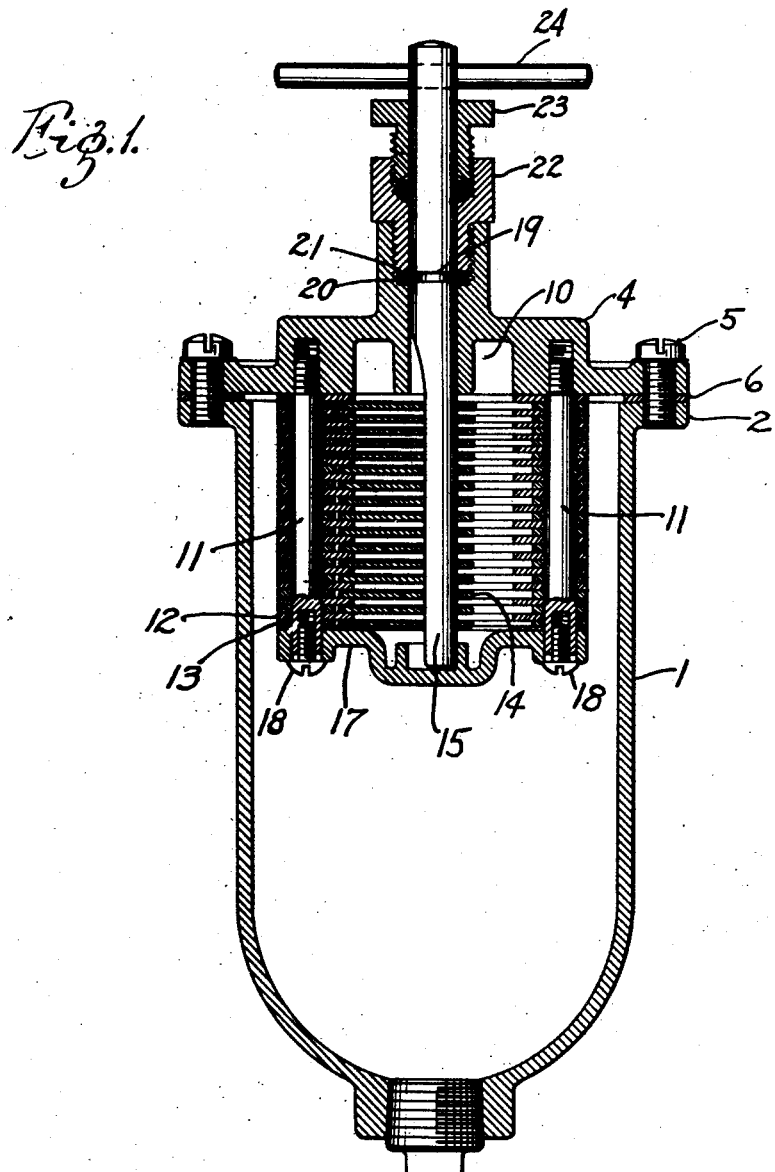

1,938,934

UNITED STATES PATENT OFFICE 1,938,934

FILTERING APPARATUS

Lewis L. Scott, St. Louis, Mo.

Application June 17, 1931. Serial No. 544,997

6 Claims. (Cl. 210—167)

This invention relates to a filtering apparatus for fluids and has for its object to provide improvements by which certain advantages shall be obtained.

This filter is designed particularly for filtering out very small particles found in oils, and consists of a series of stationary discs, arranged with their faces in close proximity to one another, with narrow spaces between the discs, adapted to strain fluid as it passes from the exterior to the interior of the discs. Scraper blades are arranged in the spaces between the discs, which blades are mounted on a shaft substantially in the center of the discs, which shaft is adapted to be rotated manually, so that the scraper blades can be rotated. The scraper blades are arranged so that they stick beyond the outside diameter of the stationary discs slightly, so that when the scraper blades are rotated, any solid particles which may be on the outside of the discs will be knocked off by action of rotating the scraper blades, and said particles will fall to the bottom of a bowl which is arranged to enclose the filter discs. In practice, the amount that these scraper blades project beyond the outside diameter of the discs, is between .005" and .010".

I am familiar with the fact that it is not new to provide metal discs, spaced apart, to filter fluids, and provide some means of manually cleaning the spaces between the discs; however, most filters of this general type now on the market, have a tendency for the scrapers to catch and collect the particles to be filtered from the oil, and to work some of these particles through the spaces between the discs into the clean oil. Common practice is to locate the scraper blades in the dirty oil. With my construction, I locate the scraper blades, which are adapted to be rotated, in the clean oil, and project a very small portion of the blades through the stationary discs, so as knock off any dirt or heavy particles, rather than wipe some of said particles into the clean oil.

The invention is illustrated in the accompanying drawings, of which Figure 1 is a vertical sectional view of my filter.

Figure 2 is a side elevation of my filter, shown with the filter bowl broken away.

Figure 3 is a horizontal section on the line "AA" of Figure. 2.

Referring now to the drawings, the numeral 1 indicates a bowl provided at its upper end with a flange 2, and at its lower end with a drain plug 3. The numeral 4 indicates a head, which is secured to the bowl 1 by the screws 5. The numeral 6 indicates a gasket interposed between the head 4 and the flange 2, for effecting a tight seal. The numeral 7 indicates an intake boss for the oil, which oil is adapted to be discharged into the inside of the bowl 1, through the opening 8. The numeral 9 indicates an outlet connection for the filtered oil, which connection communicates with a centrally located chamber 10 in the head 4. The numerals 11 indicate studs which are screwed into the head 4, on which are mounted the filter discs 12. The numeral 13 indicates spacer washers mounted on studs 11 between each disc 12. In practice, the discs 12 are approximately .012" thick, and the spacer washers 13 are approximately .004" thick. The numeral 14 indicates scraper blades which are mounted on a central shaft 15, said shaft having a portion cut away so as to provide a driving means for the scrapers 14. The ends 15-A, of the scrapers 14, are adapted to project slightly through the outside diameter of the discs 12, as will be seen by referring to Figure 3. The end portions 15-A, just referred to, have slightly rounded corners 16, which join the body of the scrapers 14. The number 17 indicates a head which is adapted to fit over the studs 11 and form a closing head for the filter discs. The head 17 is secured to the studs 11 by the screws 18, see Figure 1. The head 17 is formed with a guide bearing for the lower end of the shaft 15. The shaft 15 is provided with a groove 19, in which is mounted a circular member 20, having a U shaped groove adapted to fit into the groove 19 of the shaft 15. The numeral 21 indicates washers which fit around shaft 15 on either side of the member 20. The upper central portion of the head 4 is threaded to receive the nut 22, which nut is threaded out on the inside to receive the gland 23, thereby forming a packing gland of well known construction. The handle 24 is secured to the shaft 15 so that said shaft may be manually rotated. The head 4 is provided with an opening 25, which may be used for priming the filter. The plug 26 is adapted to close the opening 25.

I claim:—

1. A filter for fluid comprising a straining wall consisting of a plurality of circular plates mounted side by side and each having a hole through the central portion, separators between adjacent plates to space them apart and form endless slots through which filtering takes place, a shaft mounted substantially in the center of said plates, scraper blades located largely in the filtered fluid mounted on said shaft and extending outwardly through said slots said scraper blades consisting of segments, a small portion of each segment in contact with the unfiltered oil and arranged so that complete rotation of the scraper blades in the filter slots may be effected.

2. A filter for fluid comprising a straining wall consisting of a plurality of circular plates mounted side by side and each having a hole through the central portion, separators between adjacent plates to space them apart and form endless slots through which filtering takes place, scraper blades located largely in the filtered fluid and projecting outwardly through said slots slightly beyond the edges of the plates which contact with the unfiltered fluid, means located in the filtered fluid adapted to move said scraper blades in said slots.

3. A filter for fluid comprising a straining wall consisting of a plurality of circular stationary plates mounted side by side and each having a hole through the central portion, separators between adjacent plates to space them apart and form endless slots through which filtering takes place, scraper blades located largely in the filtered fluid and projecting outwardly through said slots, said scraper blades consisting of segments, a portion of each segment being in contact with the unfiltered fluid and having rounded edges which join the body of the segment, said scraper blades being movable in said slots.

4. A filter for fluid comprising a straining wall consisting of a plurality of circular stationary plates mounted side by side and each having a hole through the central portion, separators between adjacent plates to space them apart and form endless slots through which filtering takes place, scraper blades located largely in the filtered fluid and projecting outwardly through said slots, said scraper blades consisting of segments, a portion of each segment being in contact with the unfiltered fluid and having inclined edges which join the body of the segment, said scraper blades being movable in said slots.

5. A filter for fluid comprising a bowl, a head attached to the bowl arranged with an inlet in direct communication with the bowl, and an outlet in communication with a central chamber formed in the head, a straining wall consisting of a plurality of circular stationary plates mounted side by side on studs secured to the head, each plate having a hole therethrough in communication with the central chamber formed in the head, separators between adjacent plates to space them apart and form endless slots through which filtering takes place, a shaft mounted substantially centrally in the head, said shaft carrying scraper blades which scraper blades consist of segments, the larger portion of which are located largely in the filtered fluid, said scraper segments projecting outwardly through said slots, a cover plate secured to the studs and forming an end cover for the holes in the plates, scraper blades being relatively movable with respect to said plates.

6. A filter for fluid comprising a bowl, a head attached to the bowl arranged with an outlet in communication with a central chamber formed in the head, an inlet to the bowl, a straining wall consisting of a plurality of stationary circular plates mounted side by side and secured to the head, each plate having a hole therethrough in communication with the central chamber formed in the head, separators between adjacent plates to space them apart and form endless slots through which filtering takes place, a shaft mounted substantially in the center of said plates, said shaft carrying scraper blades which scraper blades consist of segments, the larger portion of which are located largely in the filtered fluid and projecting outwardly through said slots slightly beyond the edges of the plates which contact with the unfiltered fluid, said scraper blades being arranged so that complete rotation of the scraper blades in said slots may be effected.

LEWIS L. SCOTT.